Patented Apr. 10, 1934

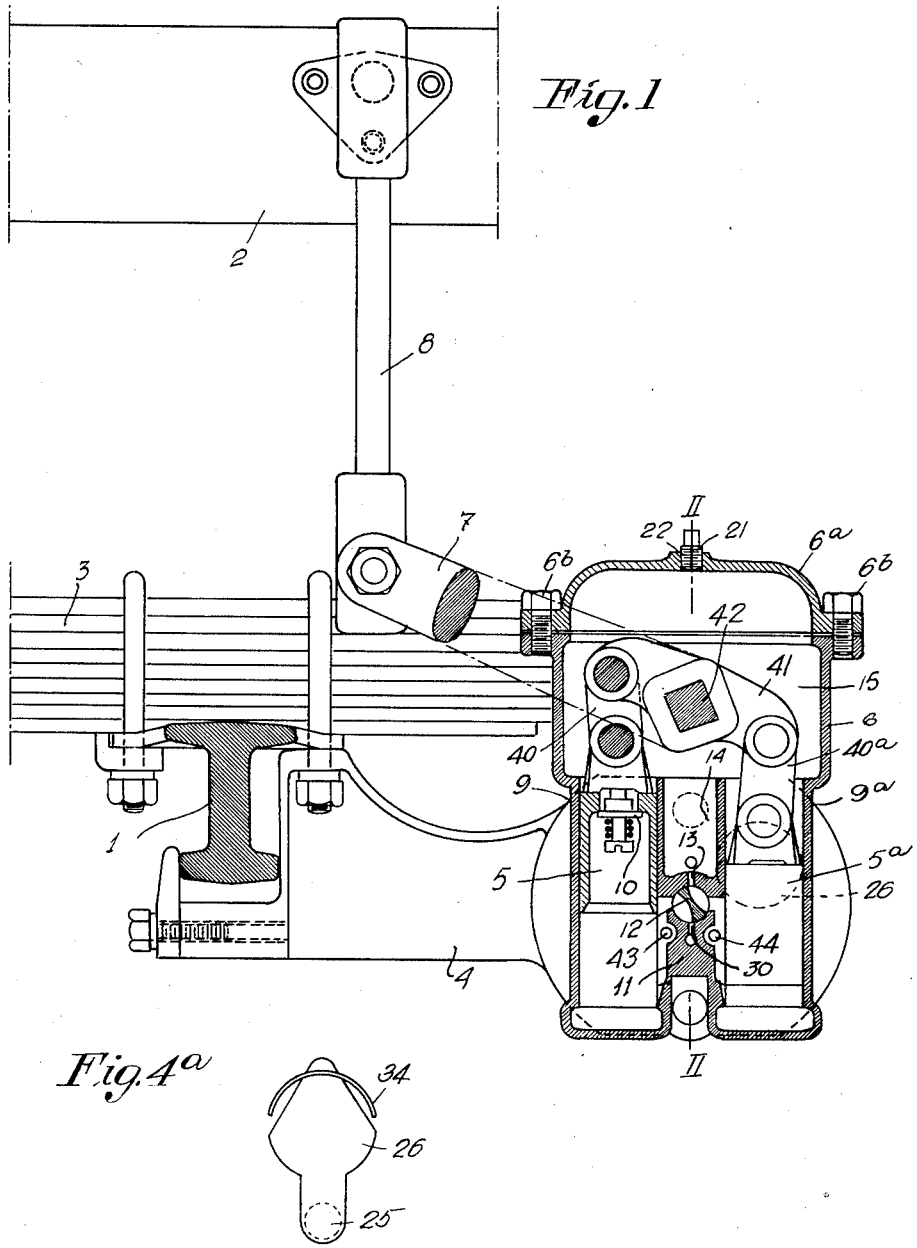

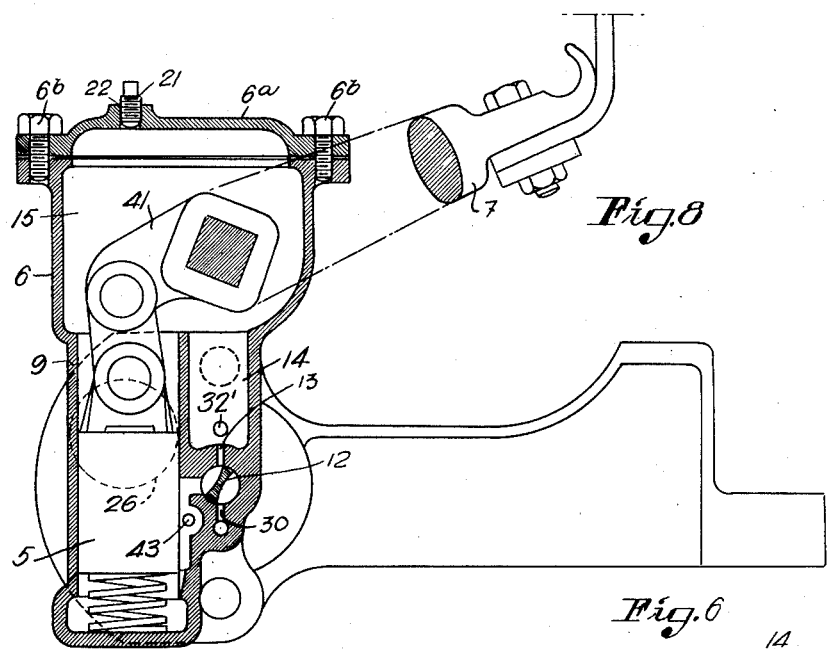
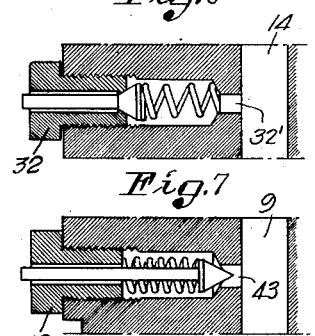
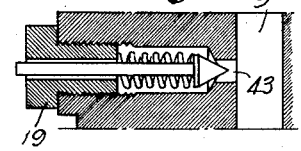
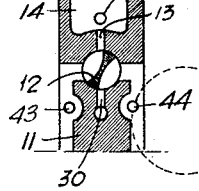
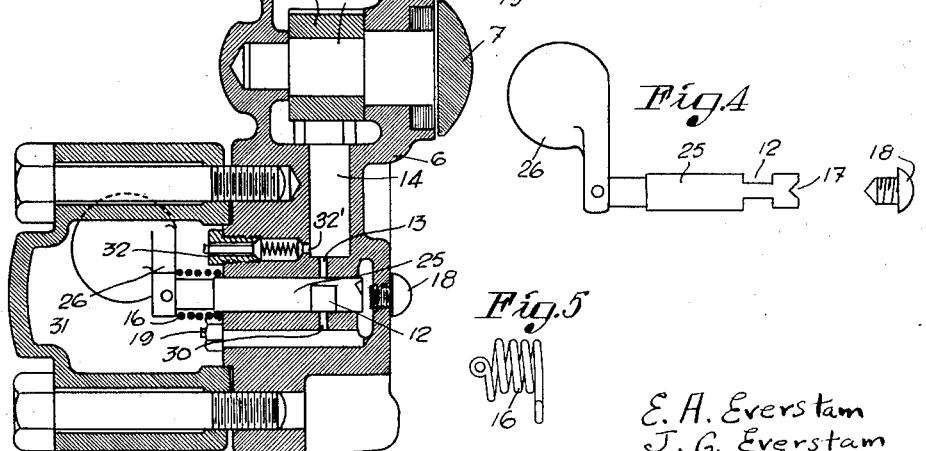

1,954,693

UNITED STATES PATENT OFFICE 1,954,693

HYDRAULIC SHOCK ABSORBER

Edit Amalia Everstam and Johan Gunnar Everstam, Stockholm, Sweden, assignors to Aktiebolaget Superior, Stockholm, Sweden, a Swedish joint-stock company Application January 28, 1931, Serial No. 511,842
In Sweden February 3, 1930

3 Claims. (Cl. 188—88)

The present invention relates to hydraulic shock absorbers for automobiles or other vehicles of the kind comprising at least one cylinder containing a damping liquid, such as oil, and a piston movable therein, said cylinder and piston being arranged between the frame of the vehicle and the axle thereof, and comprising further a valve member controlling a by-pass channel between the cylinder and the outer space, said valve being adapted to bring about communication between the cylinder and the outer space by forces of inertia produced at the upward and downward movements of the vehicle axle, so that the liquid resistance will be disconnected.

The object of the invention is to bring about substantially a complete balancing of the vehicle frame, so that the latter will move substantially at an exact distance above the road, no matter what holes the wheels have to pass.

The invention consists essentially in the combination with a shock absorber of the above mentioned type of valve-means subjected to the action of forces of inertia at the upward and downward movements of the vehicle axle and adapted to introduce a pressure liquid from a pressure liquid container to the one side of the piston or pistons, in order to cause the piston or pistons to move in the one direction. The piston or pistons and the cylinder or cylinders appertaining to the shock absorber may hereby preferably be arranged as a pump for supplying pressure liquid to the said container.

If a double-acting shock absorber is used, for instance one with two pistons, the valve controlling the by-pass channel may be so arranged as to establish connection between the cylinder of the one piston and the channel at the downward movement of the axle, while establishing connection between the other cylinder and the said channel at the subsequent upward movement of the axle.

The valve controlling the said by-pass channel or an additional valve may hereby be so arranged that liquid under high pressure will be introduced underneath the piston from the said pressure liquid container when the appurtenant cylinder is cut off from the by-pass channel. Thus, when the wheels arranged on the car axles move down into a hole in the road the frame of the car will be positively raised relatively to the car axles by a distance corresponding to the depth of the holes, whereas, when the wheels move up from the hole, the frame of the car will be pulled down relatively to the car wheels by a distance corresponding to the depth of the hole, so as to prevent the lifting effect of the car springs.

In the drawings accompanying and forming part of this application two embodiments of an arrangement according to the invention are shown. In these drawings Fig. 1 is a partly sectional elevation of the shock absorber according to the one embodiment, and Fig. 2 is a section on line II—II in Fig. 1 viewed from the left hand side. Fig. 3 is a sectional detail view of the valve member and associated parts. Fig. 4 shows a side elevation of the valve member proper having a weighted lever secured thereto. Fig. 4a indicates a modified arrangement of said weighted lever. Fig. 5 shows a spring for actuating the valve member. Fig. 6 is a sectional detail view of a safety valve member appertaining to the shock absorber, and Fig. 7 is a similar view of another valve member. Fig. 8 is a partly sectional elevation of a shock absorber according to the second embodiment.

Referring to the drawings and particularly to Figs. 1 to 7, 1 indicates the vehicle axle, 2 part of the vehicle frame and 3 part of the ordinary springs clamped to the axle. Secured to the said axle is further a bracket 4 carrying the shock absorber proper. The shock absorber comprises a housing 6 having a cover 6a secured to its top by means of screw bolts 6b and forming at its lower part two cylinders 9 and 9a having pistons 5 and 5a, respectively, movable therein. The pistons 5 and 5a are by means of links 40 and 40a, respectively, connected to a rocker arm 41 which is secured to a rock shaft 42 journalled in the casing 6. Secured to the outer free end of said rock shaft 42 is a lever 7, the free end of which is pivotally connected to a rod 8 depending from the vehicle frame 2. The pistons are provided at the top with non-return valves 10 opening in the downward direction. Disposed between the two cylinders 9 and 9a is a partition 11 forming a seat for a rotary valve 12, the stem 25 of which has connected to it a weighted lever 26, Figs. 2 and 4, said valve 12 establishing, depending on its position, communication between the one or the other of the cylinder chambers below the pistons 5 and 5a, respectively, and a chamber 14 forming part of an upper chamber 15 in the casing 6 through a channel 13 in the partition 11, the valve closing said channel 13 when obtaining a middle (neutral) position. In the position shown in Fig. 1 communication is established between the right-hand cylinder 9a and the chamber 14, whereas in the position shown in Fig. 3 communication exists between the left hand cylinder 9 and said chamber 14. Normally the valve 12 is kept in its neutral position by means of a spring 16 provided about the stem 25, Figs. 2 and 5, the one end of said spring being secured to the partition 11, and the other end thereof being secured to the lever 26. For further retention of the valve 12 in said neutral position the outer end of the stem is provided with a V-shaped indentation 17 cooperating and meshing with a similarly shaped dowel 18, Figs. 2 and 4, inserted in the casing 6, the indentation 17 and dowel 18 forming a resilient locking device, the indentation 17 being by the action of the spring 16 pressed against the dowel 18, so that the valve offers a certain resistance, according to the circumstances, against shifting from the neutral position.

The valve 12 also controls a second channel 30 within the partition 11, said channel communicating with a pressure liquid container 31, Fig. 2, located at the one side of the casing 6, said container 31 communicating also with each of the cylinders 9 and 9a through openings 43 and 44, respectively, controlled by similar spring-loaded non-return valves 19 opening in a direction towards the container 31, the valve 19 and associated parts being shown in Fig. 7 on an enlarged scale. On running the vehicle on a relatively even road with the valve 12 in its neutral closed position the pistons 5 and 5a will perform small pumping movements, thereby forcing liquid into the container 31 through the valve-controlled openings 43 and 44. In order to prevent the pressure in the container 31 from rising above that which has been found the most suitable, the container is provided with a safety valve 32, Figs. 2 and 6, controlling a communication between the container 31 and the chamber 14. A suitable liquid, such as oil, is introduced into the casing 6 through an opening 22 to be closed by means of a threaded stopper 21.

When the vehicle is moved over an even or a slightly uneven road, the shock absorber acts in known manner, the feeble jerks then produced being absorbed and equalized by the pistons 5 and 5a through their pressure on the liquid underneath the pistons, the liquid being then compressed and forced out to some small extent through the spring-loaded valves 19 into the container 31. The car frame thereby makes a little movement up and down relatively to the car axles, thereby causing the pistons and the corresponding cylinders to act as a pump delivering pressure liquid to the container.

If, however, the wheels pass a larger hole, so that the car frame would perform an appreciable movement in the vertical direction, the action aimed at by the present invention will assert its influence, in that the valve 12 provided in the shock absorber will be shifted from its neutral position at the downward movement of the wheels and the axles, in which neutral position the valve covers the outlet opening 13, to the position shown in Fig. 1, through the influence of the weighted lever 26. This is so for the reason that the weighted lever tends by its inertia to remain in its position, the valve 12 being consequently turned to the left against the action of the spring 16 and the locking means 17—18, so that the right hand cylinder 9a in Fig. 1 is brought into communication with the space 15 through the channel 13 so as to permit the liquid beneath the right hand piston 5a to escape freely through the channel 13, while pressure liquid is simultaneously supplied from the container 31 through the channel 30 into the chamber below the left piston 5, thereby causing a lifting movement of said piston. Consequently, the car axle and the shock absorber secured thereto cannot pull down the car frame 2, inasmuch as the pressure liquid introduced underneath the left piston 5 will balance the weight of the vehicle frame, so that the latter is prevented from moving downwards. Then, when the wheel moves up from the hole, the valve 12 will be turned into the position shown in Fig. 3, the weighted lever 26 now also, by reason of its inertia opposing a displacement of its centre of gravity. The space beneath the left-hand piston 5 is thus brought into direct communication with the space 15, whereas the pressure liquid is now introduced underneath the right hand piston 5a, so that the car axle will thus be prevented from exerting a raising effect on the car frame through the intermediary of the lever 7 and the rod 8, the car frame thus remaining at the same distance above the road as before.

The form of embodiment shown in Fig. 8 differs from that according to Figs. 1 to 7 in that respect only that here but one piston with appertaining cylinder is made use of. As a consequence the arrangement will be single-acting, i. e. will lower the vehicle frame due to the shown location of the piston relatively to the fulcrum of the lever 7. In the said embodiment which is adapted for maintaining the vehicle frame substantially at a constant distance above the road also when the wheels run over an obstruction on the road, pressure liquid will on such occasion be supplied through the channel 30 into the space below the piston thereby causing by means of the lever 7 a lowering of the vehicle frame (not shown), which will thus not follow the upward movement of the vehicle axle (not shown). If the wheels run into a hole in the road, the arrangement will act as an ordinary shock absorber, the valve 12 thereby taking up the position shown in the figure, in which the pressure channel 30 is out of communication with the space below the piston, the valve in the piston thereby acting in the same manner as the valve 10 in Fig. 1.

In both embodiments, the action of the shock absorber is evidently dependent on the degree of movability of the valve 12, this movability being adapted with respect to the demands placed on the arrangement in each individual case. By suitably choosing the spring 16, as well as the size of the V-shaped recess 17 in the valve stem 25 and the weight of the lever 26, the said movability of the valve can be readily adapted, and in order to facilitate shifting of the valve 12 at the movement of the wheels out of the hole, upon their having moved down into the same, the lever 26 may, if desired, be provided with a spring 34, Fig. 4a, which gives the weighted lever 26 an impulse toward upward movement when the said lever moves downwardly and the spring 34 strikes against the bottom of the casing 6 of the shock absorber.

What we claim is:—

1. A hydraulic shock absorber for controlling the movement of relatively movable parts of automobiles and other vehicles comprising a casing attachable to one of said parts and having at least one pressure chamber within it, said casing being provided also with means permitting of the circulation of a contained liquid into and out of said chamber and consisting in part of a controllable outlet, a piston attachable to the other of said relatively movable parts and reciprocable in said pressure chamber, a valve for controlling said outlet and subjected to forces of inertia produced at vertical movements of one of said parts, and a pressure fluid container in communication with said pressure chamber, the valve controlling said outlet controlling also said communication for the supply of pressure liquid from said container to said pressure chamber causing movement of the piston in the one direction.

2. A hydraulic shock absorber for controlling the movement of relatively movable parts of automobiles and other vehicles comprising a casing attachable to one of said parts and having at least one pressure chamber within it, said casing being provided also with means permitting of the circulation of a contained liquid into and out of said chamber and consisting in part of a controllable outlet, a piston attachable to the other of said relatively movable parts and reciprocable in said pressure chamber, a valve for controlling said outlet and subjected to forces of inertia produced at vertical movements of one of said parts, and a pressure fluid container in communication with said pressure chamber, a second communication being arranged between said container and said pressure chamber, a non-return valve in said second communication opening in a direction towards the container for the supply of pressure liquid thereto from said pressure chamber upon silght movements of the piston, the valve controlling said outlet controlling also said first mentioned communication for the supply of pressure liquid from said container to said pressure chamber causing movement of the piston in the one direction.

3. A shock absorber according to claim 1 characterized by the casing being rigidly connected to the axle of the vehicle and the piston being movably connected to the frame thereof.

EDIT AMALIA EVERSTAM.
JOHAN GUNNAR EVERSTAM.